US012606194B2

(12) United States Patent
Koehler et al.

(10) Patent No.: US 12,606,194 B2
(45) Date of Patent: Apr. 21, 2026

(54) COORDINATING USE OF DIFFERENT MOTION PREDICTION MODELS TO PREDICT A LOCATION OF A MOBILE ROBOT AT A FUTURE POINT IN TIME

(71) Applicant: Toyota Research Institute, Inc., Los Altos, CA (US)

(72) Inventors: Sarah M. Koehler, San Jose, CA (US); Carrie G. Bobier-Tiu, Sunnyvale, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 287 days.

(21) Appl. No.: 17/733,381

(22) Filed: Apr. 29, 2022

(65) Prior Publication Data
US 2023/0347924 A1 Nov. 2, 2023

(51) Int. Cl.
*B60W 60/00* (2020.01)
*B60W 50/00* (2006.01)

(52) U.S. Cl.
CPC ...... *B60W 60/001* (2020.02); *B60W 50/0097* (2013.01); *B60W 2050/0028* (2013.01); *B60W 2520/06* (2013.01); *B60W 2520/10* (2013.01)

(58) Field of Classification Search
CPC .......... B60W 60/001; B60W 50/0097; B60W 2050/0028; B60W 2520/06; B60W 2520/10

(Continued)

(56) References Cited

U.S. PATENT DOCUMENTS 3,830,332 A 8/1974 Fontaine
4,739,585 A 4/1988 Pickles
(Continued)

FOREIGN PATENT DOCUMENTS

CN 109318905 B * 6/2020 ............ B60W 50/00
CN 111352416 A 6/2020
JP 2017199190 A * 11/2017

OTHER PUBLICATIONS

Mary Jane Sterling, Positive and Negative Angles on a Unit Circle, Jul. 7, 2021, dummies.com (Year: 2021).*
(Continued)

*Primary Examiner* — Ramya P Burgess
*Assistant Examiner* — Preston Jay Miller
(74) *Attorney, Agent, or Firm* — Christopher G. Darrow; Darrow Mustafa PC

(57) ABSTRACT

A system for coordinating use of different motion prediction models to predict a location of a mobile robot at a future point in time can include a first motion prediction model module, a second motion prediction model module, a decision module, and an actuator module. The first motion prediction model module can determine, operating a first motion prediction model, a first prediction of a location of a mobile robot at a future point in time. The second motion prediction model module can determine, operating a second motion prediction model, a second prediction of the location of the mobile robot at the future point in time. The decision module can determine an existence of a condition. The actuator module can cause, based on a determination of the existence of the condition, the mobile robot to move based on one or more of the first prediction or the second prediction.

17 Claims, 6 Drawing Sheets

(58) Field of Classification Search
USPC ......................................................... 701/27
See application file for complete search history.

(56) References Cited

U.S. PATENT DOCUMENTS

| | | | | |
|---|---|---|---|---|
| 11,300,663 | B2 * | 4/2022 | Wuthishuwong ..... | G01S 17/931 |
| 2007/0126561 | A1 | 6/2007 | Breed | |
| 2009/0132128 | A1 | 5/2009 | Marriott et al. | |
| 2019/0072965 | A1 * | 3/2019 | Zhang .................... | G08G 1/166 |
| 2020/0074024 | A1 | 3/2020 | Levinson et al. | |
| 2020/0193182 | A1 * | 6/2020 | Kim ..................... | G06V 20/588 |
| 2020/0272160 | A1 * | 8/2020 | Djuric ....................... | G06T 7/20 |
| 2020/0307679 | A1 * | 10/2020 | Morino ............... | B62D 15/021 |
| 2021/0046951 | A1 * | 2/2021 | Kim ..................... | B62D 15/021 |
| 2021/0053616 | A1 * | 2/2021 | Funke .................. | G05D 1/0088 |
| 2021/0272018 | A1 * | 9/2021 | Casas ....................... | G06N 7/01 |
| 2021/0300425 | A1 * | 9/2021 | Hyde ...................... | G06N 3/045 |
| 2021/0302974 | A1 * | 9/2021 | Di Cairano .............. | G06N 5/01 |
| 2022/0185288 | A1 * | 6/2022 | Boydston .......... | B60W 30/0953 |
| 2022/0234618 | A1 * | 7/2022 | Kabzan ............. | B60W 50/0097 |
| 2022/0397914 | A1 * | 12/2022 | Guo ..................... | G05D 1/0088 |

OTHER PUBLICATIONS

Du et al., "Development of a Genetic-Algorithm-Based Nonlinear Model Predictive Control Scheme on Velocity and Steering of Autonomous Vehicles", IEEE Transactions on Industrial Electronics, vol. 63 Issue: 11, pp. 6970-6977 (Year: 2016).*

English Translation of JP-2017199190-A (Year: 2017).*

English translation of CN-109318905-B (Year: 2020).*

Vu et al., "Model Predictive Control for Autonomous Driving Vehicles," Electronics, vol. 10, 2021, pp. 1-15.

J.T. Quigley, "High-Tech Tokyo Taxis Will Sound an Alarm for Left-Behind Luggage," Sep. 10, 2013, 3 pages, found at https://thediplomat.com/2013/09/high-tech-tokyo-taxis-will-sound-an-alarm-for-left-behind-luggage/.

Minh et al., "Motion tracking glove for augmented reality and virtual reality," Paladyn Journal of Behavioral Robotics, 2019, vol. 10, pp. 160-166.

Zhao et al., "Design of a Control System for an Autonomous Vehicle Based on Adaptive-PID," International Journal of Advanced Robotic Systems, 2012, vol. 9, issue 2, pp. 1-11.

Taghavifar et al., "Path-tracking of autonomous vehicles using a novel adaptive robust exponential-like-sliding-mode fuzzy type-2 neural network controller," Mechanical Systems and Signal Processing, vol. 130, Sep. 2019, pp. 41-55.

Hu et al., "MME-EKF-Based Path-Tracking Control of Autonomous Vehicles Considering Input Saturation," in IEEE Transactions on Vehicular Technology, vol. 68, No. 6, Jun. 2019, pp. 5246-5259.

Wang et al., "Robust trajectory tracking control for autonomous vehicle subject to velocity-varying and uncertain lateral disturbance," Archives of Transport, 2021, vol. 57, pp. 7-23.

Calzolari et al., "Comparison of trajectory tracking controllers for autonomous vehicles," In Proceedings of the 2017 IEEE 20th International Conference on Intelligent Transportation Systems (ITSC), pp. 1-8.

Jezierski et al., "A Comparison of LQR and MPC Control Algorithms of an Inverted Pendulum," In 2017 Trends in Advanced Intelligent Control, Optimization and Automation, pp. 65-76.

Alcala et al., "Autonomous vehicle control using a kinematic Lyapunov-based technique with LQR-LMI tuning," Control Engineering Practice, vol. 73, 2018, pp. 1-12.

Lee et al., "Optimal Path Tracking Control of Autonomous Vehicle: Adaptive Full-State Linear Quadratic Gaussian (LQG) Control," IEEE Access vol. 7, 2019, pp. 109120-109133.

Vu et al., "Robust Model Predictive Control for Input Saturated and Softened State Constraints," Asian Journal of Control, 2005, vol. 7, No. 3, pp. 319-325.

Vu Trieu Minh, "Nonlinear Model Predictive Controller and Feasible Path Planning for Autonomous Robots," Open Computer Science, vol. 6, 2016, pp. 178-186.

Reda et al., "Model Predictive Control for Automated Vehicle Steering," Acta Polytech. Hung. 2020, vol. 17, pp. 163-182.

Geng et al., "Robust Path Tracking Control for Autonomous Vehicle Based on a Novel Fault Tolerant Adaptive Model Predictive Control Algorithm," Applied Sciences 2020, vol. 10, issue 18, pp. 1-20.

Chen et al., "Implementation of MPC-Based Trajectory Tracking Considering Different Fidelity Vehicle Models," Journal of Beijing Institute of Technology, vol. 9, No. 3, pp. 303-316.

Marcano et al., "A Review of Shared Control for Automated Vehicles: Theory and Applications," in IEEE Transactions on Human-Machine Systems, vol. 50, No. 6, Dec. 2020, pp. 475-491.

Chen et al., "MPC-based path tracking with PID speed control for autonomous vehicles," IOP Conf. Series: Materials Science and Engineering, 2020, vol. 892, pp. 3702-3720.

Minh et al., "Model Predictive Control for Autonomous Vehicle Tracking," International Journal of Innovative Technology and Interdisciplinary Sciences, 2021, vol. 4, pp. 560-603.

Wang et al., "Intelligent vehicle lane change trajectory control algorithm based on weight coefficient adaptive adjustment," Advances in Mechanical Engineering, vol. 13, 2021, pp. 1-16.

Cao et al., "MPC Tracking Controller Parameters Impacts in Roundabouts," Mathematics, vol. 9, 2021, pp. 1-18.

Minh et al., "Tracking setpoint robust model predictive control for input saturated and softened state constraints," IInternational Journal of Control, Automation, and Systems, vol. 9, 2011, pp. 958-965.

Djuric et al., "Uncertainty-aware Short-term Motion Prediction of Traffic Actors for Autonomous Driving," Proceedings of the IEEE/CVF Winter Conference on Applications of Computer Vision (WACV), 2020, pp. 2095-2104.

Cui et al., "Multimodal Trajectory Predictions for Autonomous Driving using Deep Convolutional Networks," 2019 International Conference on Robotics and Automation (ICRA), pp. 2090-2096.

Ding et al., "CMTS: Conditional Multiple Trajectory Synthesizer for Generating Safety-critical Driving Scenarios," 2020 IEEE International Conference on Robotics and Automation (ICRA) pp. 4314-4321.

Kong et al., "Kinematic and dynamic vehicle models for autonomous driving control design," 2015 IEEE Intelligent Vehicles Symposium (IV), pp. 1094-1099.

Zhao et al., "Estimation of the Vehicle Speed in the Driving Mode for a Hybrid Electric Car Based on an Unscented Kalman Filter," Journal of Automobile Engineering, vol. 229, No. 9, 2015, pp. 437-456.

Cui et al., "Deep Kinematic Models for Kinematically Feasible Vehicle Trajectory Predictions," 2020 IEEE International Conference on Robotics and Automation (ICRA), pp. 10563-10569.

Zago et al., "Internal Models of Target Motion: Expected Dynamics Overrides Measured Kinematics in Timing Manual Interceptions," Journal of Neurophysiology, vol. 91, No. 4, pp. 1620-1634.

* cited by examiner

100

Processor
102

Second Motion
Prediction Model
Module
108

Actuator
Module
112

First Motion
Prediction Model
Module
106

Decision
Module
110

Memory 104

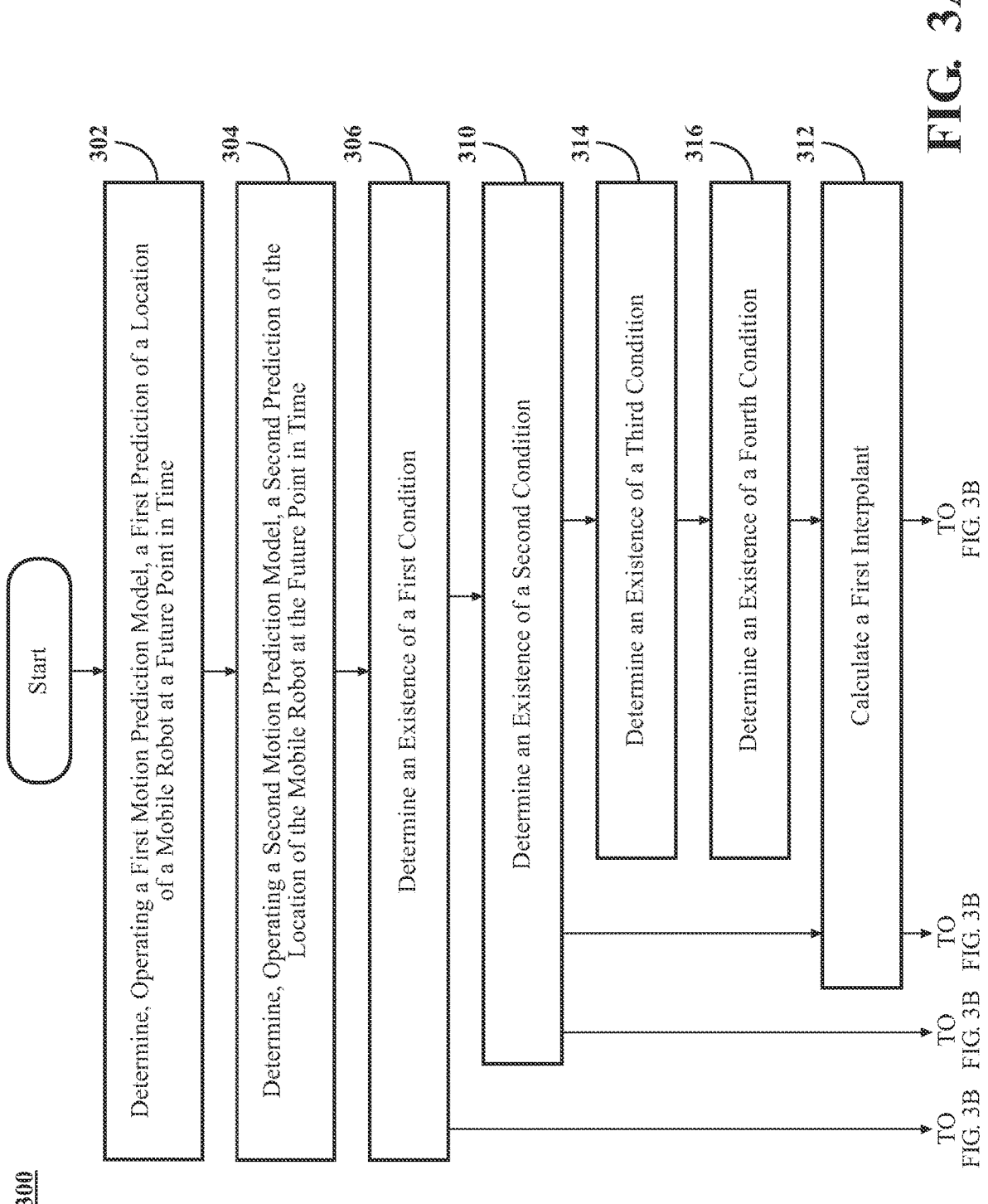

300

302 — Determine, Operating a First Motion Prediction Model, a First Prediction of a Location of a Mobile Robot at a Future Point in Time 304 — Determine, Operating a Second Motion Prediction Model, a Second Prediction of the Location of the Mobile Robot at the Future Point in Time 306 — Determine an Existence of a First Condition 310 — Determine an Existence of a Second Condition 314 — Determine an Existence of a Third Condition 316 — Determine an Existence of a Fourth Condition 312 — Calculate a First Interpolant Start

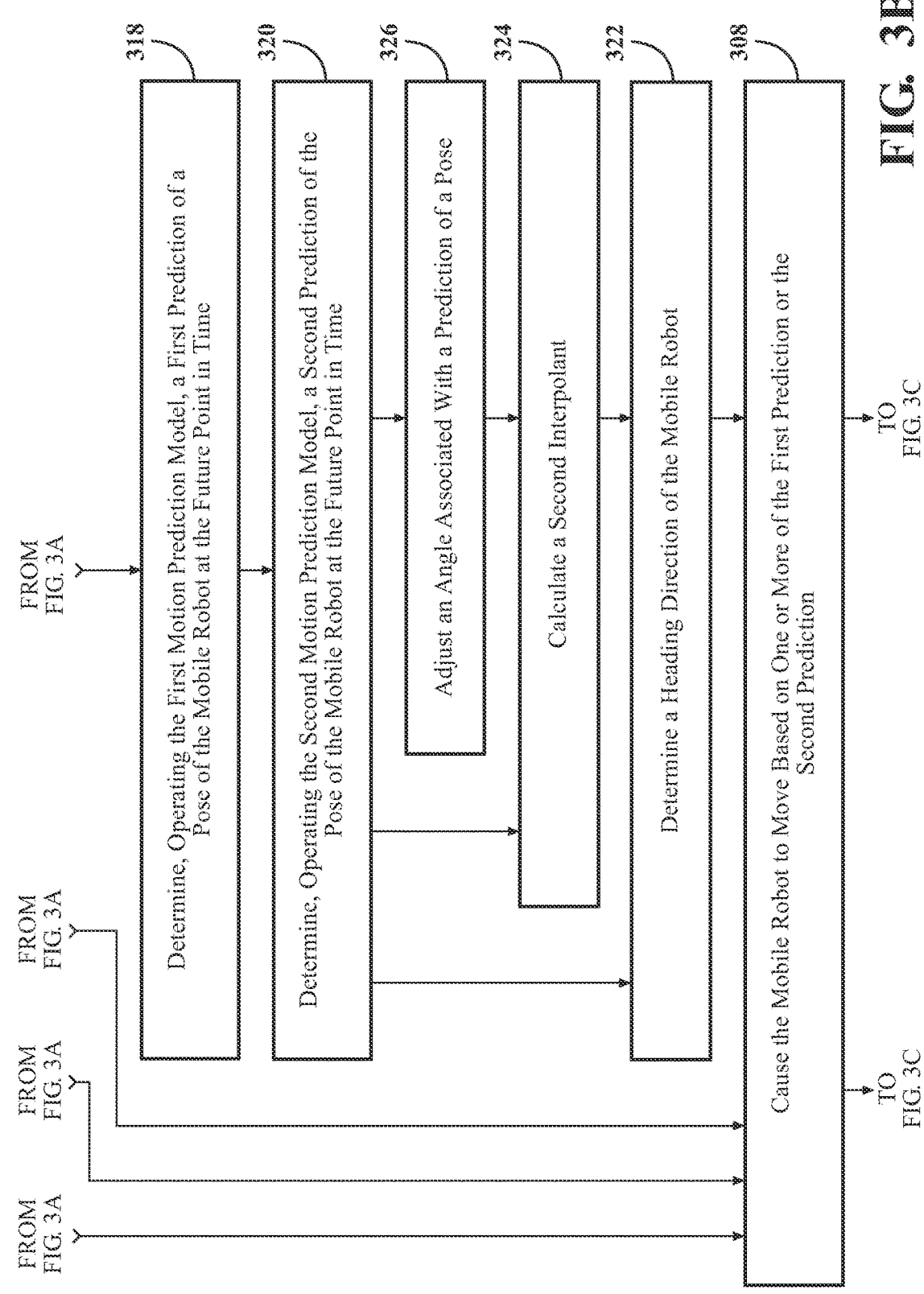

FROM FIG. 3A

FROM FIG. 3A

FROM FIG. 3A

FROM FIG. 3A

318 — Determine, Operating the First Motion Prediction Model, a First Prediction of a Pose of the Mobile Robot at the Future Point in Time 320 — Determine, Operating the Second Motion Prediction Model, a Second Prediction of the Pose of the Mobile Robot at the Future Point in Time 326 — Adjust an Angle Associated With a Prediction of a Pose 324 — Calculate a Second Interpolant 322 — Determine a Heading Direction of the Mobile Robot 308 — Cause the Mobile Robot to Move Based on One or More of the First Prediction or the Second Prediction

COORDINATING USE OF DIFFERENT MOTION PREDICTION MODELS TO PREDICT A LOCATION OF A MOBILE ROBOT AT A FUTURE POINT IN TIME

TECHNICAL FIELD

The disclosed technologies are directed to coordinating use of different motion prediction models to predict a location of a mobile robot at a future point in time.

BACKGROUND

An automated motion technology system can be used to cause a mobile robot to move independently in an environment with one or more other objects. Such an automated motion technology system can be arranged to perform functions in stages. Such stages can include, for example, a sensing stage, a perception stage, and a decision stage.

The sensing stage can include technologies through which the mobile robot can detect, for example, information about the one or more other objects in the environment and/or information about a location and/or a movement of the mobile robot.

The perception stage can perform functions on information from the sensing stage to produce information that facilitates a better understanding of the environment of the mobile robot. Such functions can include, for example, localization of the mobile robot, recognition of the one or more other objects, and tracking a motion of the one or more other objects. Localization can include functions to determine a position of the mobile robot with a margin of error of less than a decimeter.

The decision stage can perform functions on information from the perception stage to produce, by a prediction system, one or more predictions about a location of the mobile robot at a future point in time and about trajectories of the one or more objects; to produce, by a planning system and based on the one or more predictions, a planned trajectory for the mobile robot; and to produce, by a control system, a control signal to cause the mobile robot to move according to the planned trajectory.

For example, the mobile robot can be an automated vehicle. For example, the control signal can be communicated via a controller area network (CAN) bus to one or more vehicle systems of the automated vehicle to realize movement of the automated vehicle according to the planned trajectory. The one or more vehicle systems can include, for example, a propulsion system, a braking system, a steering system, a throttle system, a transmission system, a signaling system, and/or a navigation system.

SUMMARY

In an embodiment, a system for coordinating use of different motion prediction models to predict a location of a mobile robot at a future point in time can include a processor and a memory. The memory can store a first motion prediction model module, a second motion prediction model module, a decision module, and an actuator module. The first motion prediction model module can include instructions that, when executed by the processor, cause the processor to determine, operating a first motion prediction model, a first prediction of a location of a mobile robot at a future point in time. The second motion prediction model module can include instructions that, when executed by the processor, cause the processor to determine, operating a second motion prediction model, a second prediction of the location of the mobile robot at the future point in time. The decision module can include instructions that, when executed by the processor, cause the processor to determine an existence of a condition. The actuator module can include instructions that, when executed by the processor, cause the processor to cause, based on a determination of the existence of the condition, the mobile robot to move based on at least one of the first prediction or the second prediction.

In another embodiment, a method for coordinating use of different motion prediction models to predict a location of a mobile robot at a future point in time can include determining, by a processor operating a first motion prediction model, a first prediction of a location of a mobile robot at a future point in time. The method can include determining, by the processor operating a second motion prediction model, a second prediction of the location of the mobile robot at the future point in time. The method can include determining, by the processor, an existence of a condition. The method can include causing, by the processor and based on a determination of the existence of the condition, the mobile robot to move based on at least one of the first prediction or the second prediction.

In another embodiment, a non-transitory computer-readable medium for coordinating use of different motion prediction models to predict a location of a mobile robot at a future point in time can include instructions that, when executed by one or more processors, cause the one or more processors to determine, operating a first motion prediction model, a first prediction of a location of a mobile robot at a future point in time. The non-transitory computer-readable medium can also include instructions that, when executed by one or more processors, cause the one or more processors to determine, operating a second motion prediction model, a second prediction of the location of the mobile robot at the future point in time. The non-transitory computer-readable medium can also include instructions that, when executed by one or more processors, cause the one or more processors to determine an existence of a condition. The non-transitory computer-readable medium can also include instructions that, when executed by one or more processors, cause the one or more processors to cause, based on a determination of the existence of the condition, the mobile robot to move based on at least one of the first prediction or the second prediction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 3A through 3C include a flow diagram that illustrates an example of a method that is associated with coordinating use of different motion prediction models to predict a location of a mobile robot at a future point in time, according to the disclosed technologies.

DETAILED DESCRIPTION

Figure 1:
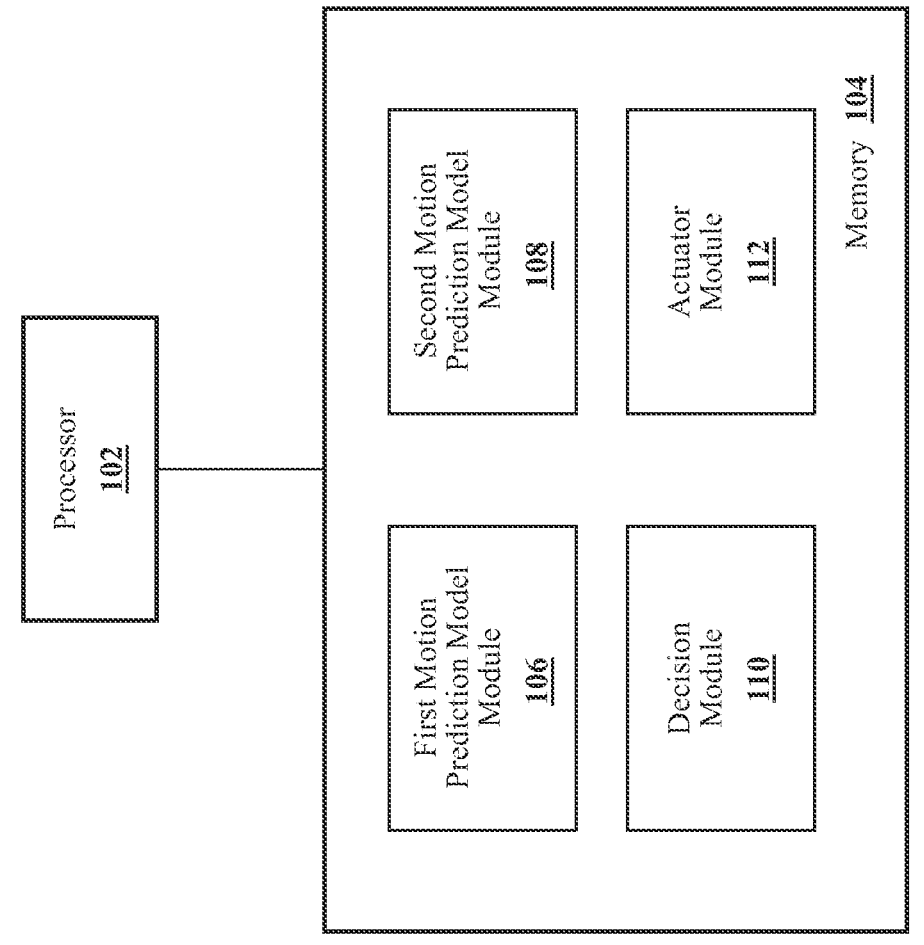
FIG. 1 includes a block diagram that illustrates an example of a system for coordinating use of different motion prediction models to predict a location of a mobile robot at a future point in time, according to the disclosed technologies.

A prediction system, of an automated motion technology system, can produce one or more predictions about a location of the mobile robot at a future point in time. To perform such functions, the prediction system can use a motion prediction model. Such a motion prediction model can be, for example, a kinematic model, which can describe a motion of the mobile robot without regard for one or more forces that cause the mobile robot to move. Alternatively, such a motion prediction model can be, for example, a dynamic model, which can describe a motion of the mobile robot with regard for one or more forces that act on the mobile robot and with regard for forces produced by lateral acceleration when the mobile robot turns. Such forces produced by lateral acceleration can cause a slip angle to manifest. The slip angle can be an angle between a direction in which a wheel is pointing and a direction in which the wheel actually is moving. Because equations used by a dynamic model to describe the motion of the mobile robot can include terms in which a divisor can be a speed of the mobile robot, using the dynamic model to control a motion of the mobile robot can be problematic in an environment in which the speed of the mobile robot often can be zero, such as in stop-and-go scenarios common in urban environments. Fortunately, equations used by a kinematic model do not present such problems. Additionally, because little lateral acceleration can be produced when a mobile robot turns at a low speed (e.g., less than five miles per hour), a description of a motion of a mobile robot produced by a kinematic model when the mobile robot is moving at a low speed can be sufficiently accurate to be used to control a motion of the mobile robot moving at a low speed.

The disclosed technologies are directed to coordinating use of different motion prediction models to predict a location of a mobile robot at a future point in time. For example, the mobile robot can include an automated vehicle. A first prediction of the location of the mobile robot at the future point in time can be determined by a processor operating a first motion prediction model. For example, the first motion prediction model can be a kinematic model. A second prediction of the location of the mobile robot at the future point in time can be determined by the processor operating a second motion prediction model. For example, the second motion prediction model can be a dynamic model. An existence of a condition can be determined by the processor. For example, the condition can be a speed of the mobile robot being less than a threshold speed. Based on a determination of the existence of the condition, the mobile robot can be caused, by the processor, to move based on at least one of the first prediction or the second prediction. For example, in response to the existence of the condition, the mobile robot can be caused to move based on the first prediction. Conversely, for example, in response to a lack of the existence of the condition, the mobile robot can be caused to move based on the second prediction.

FIG. 1 includes a block diagram that illustrates an example of a system 100 for coordinating use of different motion prediction models to predict a location of a mobile robot at a future point in time, according to the disclosed technologies. The system 100 can include, for example, a processor 102 and a memory 104. The memory 104 can be communicably coupled to the processor 102. The memory 104 can store, for example, a first motion prediction model module 106, a second motion prediction model module 108, a decision module 110, and an actuator module 112. For example, the processor 102 and the memory 104 can be configured to be disposed on a mobile robot. For example, the mobile robot can include an automated vehicle.

For example, the first motion prediction model module 106 can include instructions that function to control the processor 102 to determine, operating a first motion prediction model, a first prediction of the location of the mobile robot at the future point in time. For example, the first motion prediction model can be selected from the group consisting of a kinematic model, a dynamic model, another physics-based model, or a machine learning-based model.

For example, the second motion prediction model module 108 can include instructions that function to control the processor 102 to determine, operating a second motion prediction model, a second prediction of the location of the mobile robot at the future point in time. For example, the second motion prediction model can be selected from the group consisting of the kinematic model, the dynamic model, the other physics-based model, or the machine learning-based model. The second motion prediction model can be different from the first motion prediction model.

For example, the decision module 110 can include instructions that function to control the processor 102 to determine an existence of a first condition.

For example, the actuator module 112 can include instructions that function to control the processor 102 to cause, based on a determination of the existence of the first condition, the mobile robot to move based on one or more of the first prediction or the second prediction.

In a first implementation, the first condition can be a speed of the mobile robot being less than a first threshold speed (e.g., five miles per hour).

In a first variation of the first implementation, the instructions to cause the mobile robot to move can include: (1) instructions to cause, in response to the existence of the first condition, the mobile robot to move based on the first prediction and (2) instructions to cause, in response to a lack of the existence of the first condition, the mobile robot to move based on the second prediction.

In a second variation of the first implementation, the decision module 110 can further include instructions that function to control the processor 102 to determine an existence of a second condition. The second condition can be the speed of the mobile robot being greater than a second threshold speed (e.g., twenty-five miles per hour). The second threshold speed can be greater than the first threshold speed. The instructions to cause the mobile robot to move can include: (1) instructions to cause, in response to the existence of the first condition, the mobile robot to move based on the first prediction, (2) instructions to cause, in response to the existence of the second condition, the mobile robot to move based on the second prediction, and (3) instructions to cause, in response to a lack of the existence of the first condition and a lack of the existence of the second condition, the mobile robot to move based on one or more of the first prediction or the second prediction.

In a first adaptation of the second variation of the first implementation, the decision module 110 can further include instructions that function to control the processor 102 to calculate a first interpolant. The first interpolant can be between the first prediction and the second prediction. The instructions to cause, in response to the lack of the existence of the first condition and the lack of the existence of the second condition, the mobile robot to move based on the one or more of the first prediction or the second prediction can include instructions to cause the mobile robot to move based on the first interpolant.

In a first modification of the first adaptation of the second variation of the first implementation, the decision module 110 can further include instructions that function to control the processor 102 to: (1) determine an existence of a third condition and (2) determine an existence of a fourth condition. The third condition can be the speed of the mobile robot being equal to the first threshold speed. The fourth condition can be the speed of the mobile robot being equal to the second threshold speed. The instructions to calculate the first interpolant can include: (1) instructions to cause, in response to the existence of the third condition, a value of the first interpolant to be equal to the first prediction, (2) instructions to cause, in response to the existence of the fourth condition, the value of the first interpolant to be equal to the second prediction, and (3) instructions to cause, in response a lack of the existence of the third condition and a lack of the existence of the fourth condition, the value of the first interpolant to be equal to a value of a function. For example, the function can be a linear function. Alternatively, for example, the function can be a sigmoid function.

In a second modification of the first adaptation of the second variation of the first implementation, the first motion prediction model module 106 can further include instructions to determine, operating the first motion prediction model, a first prediction of a pose of the mobile robot at the future point in time. The second motion prediction model module 108 can further include instructions to determine, operating the second motion prediction model, a second prediction of the pose of the mobile robot at the future point in time. The decision module 110 can further include instructions that function to control the processor 102 to determine, based on one or more of the first prediction of the pose or the second prediction of the pose, a heading direction of the mobile robot. The instructions to cause the mobile robot to move can include instructions to cause, based on the heading direction, the mobile robot to move.

For example, in the second modification of the first adaptation of the second variation of the first implementation, the instructions to determine, based on the one or more of the first prediction of the pose or the second prediction of the pose, the heading direction can include: (1) instructions to determine, in response to the existence of the first condition, the heading direction based on the first prediction of the pose, (2) instructions to determine, in response to the existence of the second condition, the heading direction based on the second prediction of the pose, and (3) instructions to determine, in response to the lack of the existence of the first condition and the lack of the existence of the second condition, the heading direction based on the one or more of the first prediction of the pose or the second prediction of the pose.

Additionally, in this example of the second modification of the first adaptation of the second variation of the first implementation, the decision module 110 can further include instructions to calculate a second interpolant. The second interpolant can be between the first prediction of the pose and the second prediction of the pose. The instructions to determine, in response to the lack of the existence of the first condition and the lack of the existence of the second condition, the heading direction based on the one or more of the first prediction of the pose or the second prediction of the pose can include instructions to determine the heading direction based on the second interpolant.

For example, an angle can be formed between a direction associated with a prediction of the pose and a direction associated with a frame of reference. The frame of reference can be independent of the mobile robot. The angle can be different from a reflex angle (i.e., an angle between 180 degrees and 360 degrees). That is, if the angle is formed on a first side of the direction associated with the frame of reference, then the angle can be represented by a positive number; if the angle is formed on a second side of the direction associated with the frame of reference, then the angle can be represented by a negative number. The decision module 110 can further include instructions to adjust, before operation of the instructions to calculate the second interpolant, one or more of: (1) the angle formed on the first side of the direction associated with the frame of reference or (2) the angle formed on the second side of the direction associated with the frame of reference to prevent, in the second interpolant, an error associated with: (1) an angle formed between a direction associated with the first prediction of the pose and the direction associated with the frame of reference having a first sign and (2) an angle formed between a direction associated with the second prediction of the pose and the direction associated with the frame of reference having a second sign.

Moreover, in this example of the second modification of the first implementation of the second variation of the first implementation, the instructions to adjust the one or more of: (1) the angle formed on the first side of the direction associated with the frame of reference or (2) the angle formed on the second side of the direction associated with the frame of reference can include: (1) instructions to determine which of the first sign and the second sign is a negative sign, (2) instructions to add, based on a determination that the first sign is the negative sign, 360 degrees to the angle formed on the first side of the direction associated with the frame of reference, and (3) instructions to add, based on a determination that the second sign is the negative sign, 360 degrees to the angle formed on the second side of the direction associated with the frame of reference.

Additionally or alternatively, in this example of the second modification of the first implementation of the second variation of the first implementation, the instructions to adjust the one or more of: (1) the angle formed on the first side of the direction associated with the frame of reference or (2) the angle formed on the second side of the direction associated with the frame of reference can include: (1) instructions to determine the heading direction based on a tracking of a path of travel of the mobile robot, (2) instructions to determine if the heading direction, based on the first prediction of the pose, is different from the heading direction, based on the tracking of the path of travel of the mobile robot, by greater than a threshold amount, (3) instructions to determine if the heading direction, based on the second prediction of the pose, is different from the heading direction, based on the tracking of the path of travel of the mobile robot, by greater than the threshold amount, (4) instruction to adjust the heading direction, based on the first prediction of the pose, based on a determination that a difference between the heading direction, based on the first prediction of the pose, and the heading direction, based on the tracking of the path of travel of the mobile robot, is greater than the threshold amount, and (5) instruction to adjust the heading direction, based on the second prediction of the pose, based on a determination that a difference between the heading direction, based on the second prediction of the pose, and the heading direction, based on the tracking of the path of travel of the mobile robot, is greater than the threshold amount.

Figure 2:
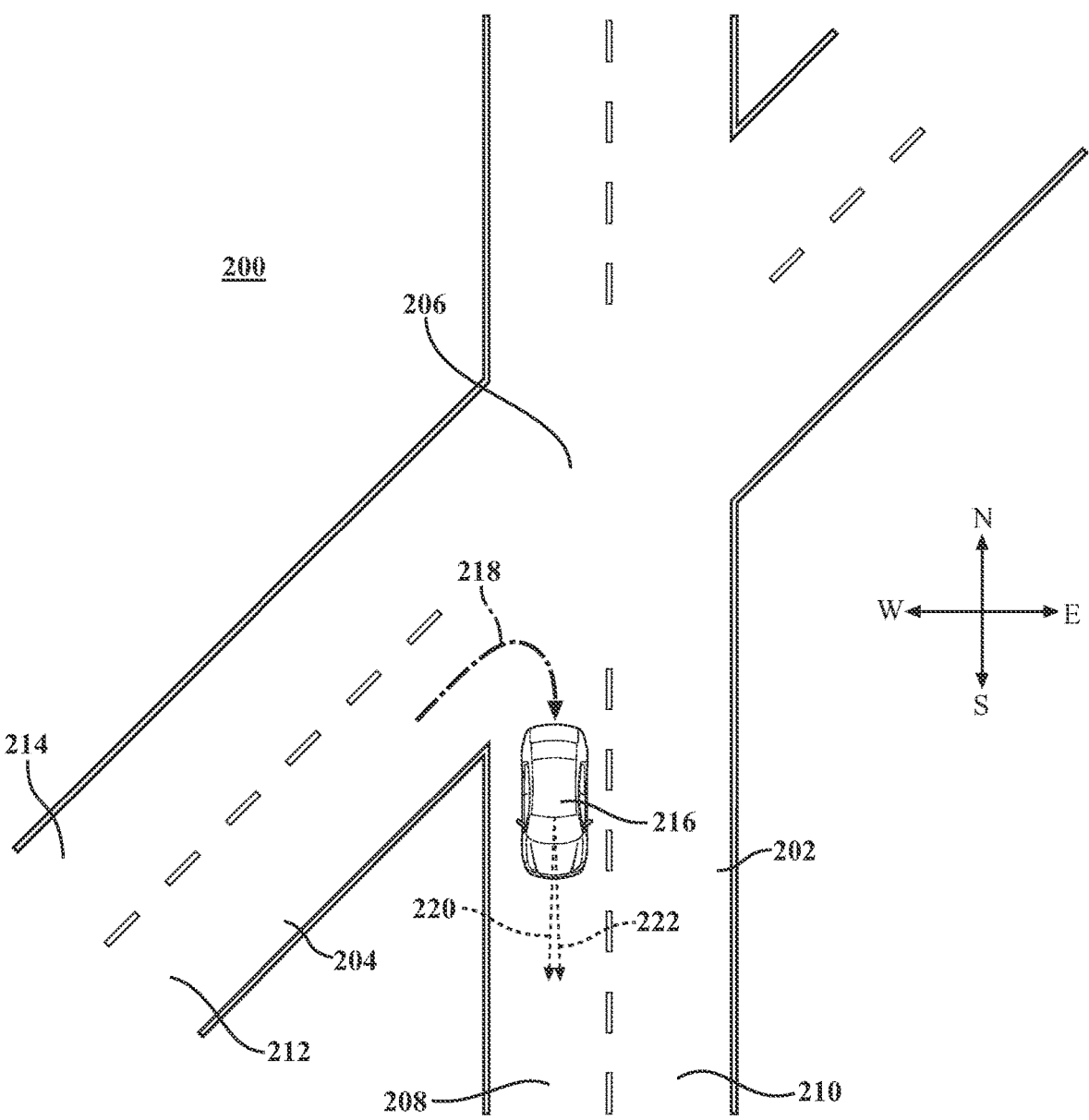
FIG. 2 includes a diagram that illustrates an example of an environment for coordinating use of different motion prediction models to predict a location of a mobile robot at a future point in time, according to the disclosed technologies.

FIG. 2 includes a diagram that illustrates an example of an environment 200 for coordinating use of different motion prediction models to predict a location of a mobile robot at a future point in time, according to the disclosed technologies. For example, the environment 200 can include a first road 202 (disposed along a line of longitude) and a second road 204 (disposed along a line from southwest to northeast). For example, a crossroads intersection 206 can be formed by the first road 202 and the second road 204. For example, the first road 202 can include a southbound lane 208 and a northbound lane 210. For example, the second road 204 can include a northeastbound lane 212 and a southwestbound lane 214. For example, a vehicle 216 can be in the southbound lane 208 of the first road 202 just south of the crossroads intersection 206. For example, the vehicle 216 can: (1) be on a path of travel 218 from the second road 204 to the first road 202, (2) just have completed a turn from the second road 204 to the first road 202, and (3) have a speed of fifteen miles per hour.

For example, the vehicle 216 can include the system 100 (illustrated in FIG. 1). For example: (1) the first motion prediction model can be a kinematic model and (2) the second motion prediction model can be a dynamic model. For example: (1) the first condition can be the speed of the vehicle 216 being less than five miles per hour and (2) the second condition can be the speed of the vehicle 216 being greater than twenty-five miles per hour. For example, the frame of reference used by both the kinematic model and the dynamic model can be a geographic frame of reference in which angles are measured with respect to north such that: (1) an angle formed on a west side of north can be represented by a positive number and (2) an angle formed on an east side of north can be represented by a negative number. For example: (1) a heading direction 220 based on a first prediction of a pose of the vehicle 216 determined by the first motion prediction model module 106 (illustrated in FIG. 1) operating the kinematic model can be +178 degrees and (2) a heading direction 222 based on a second prediction of the pose of the vehicle 216 determined by the second motion prediction model module 108 (illustrated in FIG. 1) operating the dynamic model can be −178 degrees.

In order to prevent having the decision module 110 (illustrated in FIG. 1): (1) calculate that the second interpolant is zero degrees (e.g., the average of +178 degrees and −178 degrees) and (2) determine an erroneous heading direction of the vehicle 216 based on such a calculation of the second interpolant, the decision module 110 can adjust, before the calculation of the second interpolant, an angle associated with the second prediction of the pose of the vehicle 216 determined by the second motion prediction model module 108 operating the dynamic model to be +182 degrees by adding 360 degrees to −178 degrees. Additionally or alternatively, the decision module 110 can determine heading directions, based on a tracking of the path of travel 218 of the vehicle 216, have had negative numbers so that a difference between the heading direction 220 (+178 degrees) and the heading directions, based on the tracking of the path of travel 218 of the vehicle 216, is greater than a threshold amount (e.g., thirty degrees) and, therefore, the heading direction 220 (+178 degrees) needs to be adjusted.

In this manner, the decision module 110 can: (1) calculate that the second interpolant is 180 degrees (i.e., the average of +178 degrees and +182 degrees) and (2) determine a more realistic value for the heading direction of the vehicle 216 based on such a calculation of the second interpolant.

Returning to FIG. 1, in a second adaptation of the second variation of the first implementation: (1) the first motion prediction model module 106 can further include instructions to cause a cessation of an operation of the first motion prediction model in response to a determination of the existence of the first condition for greater than a threshold duration of time (e.g., five minutes) and (2) the second motion prediction model module 108 can further include instructions to cause a cessation of an operation of the second motion prediction model in response to a determination of the existence of the second condition for greater than the threshold duration of time.

In a second implementation, the first condition can be a degree of curvature of a road at a current location of the mobile robot being greater than a threshold degree of curvature.

In a variation of the second implementation, the instructions to cause the mobile robot to move can include: (1) instructions to cause, in response to the existence of the first condition, the mobile robot to move based on the first prediction and (2) instructions to cause, in response to a lack of the existence of the first condition, the mobile robot to move based on the second prediction.

Figure 3C:
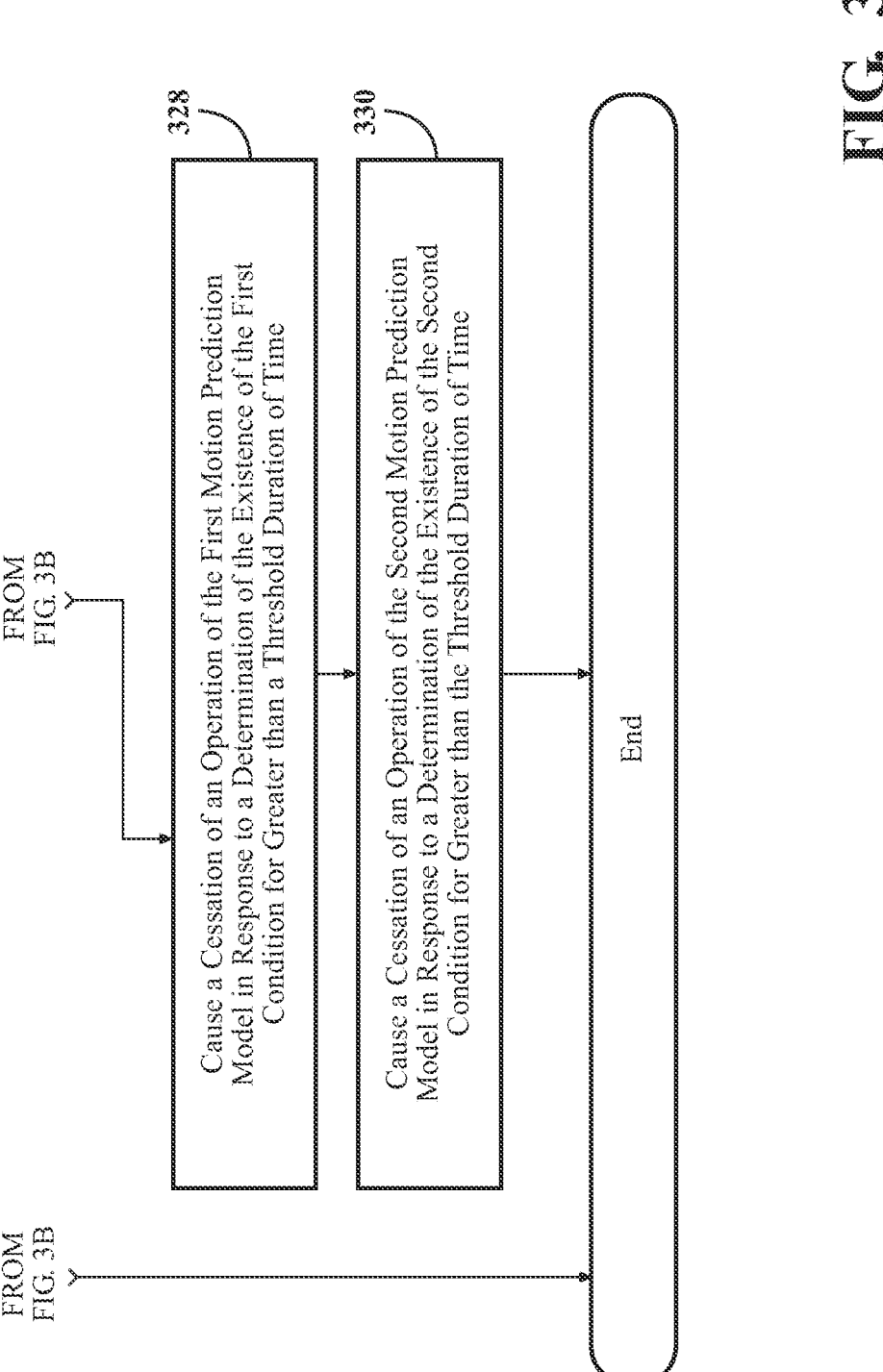

FIGS. 3A through 3C include a flow diagram that illustrates an example of a method 300 that is associated with coordinating use of different motion prediction models to predict a location of a mobile robot at a future point in time, according to the disclosed technologies. Although the method 300 is described in combination with the system 100 illustrated in FIG. 1, one of skill in the art understands, in light of the description herein, that the method 300 is not limited to being implemented by the system 100 illustrated in FIG. 1. Rather, the system 100 illustrated in FIG. 1 is an example of a system that may be used to implement the method 300. Additionally, although the method 300 is illustrated as a generally serial process, various aspects of the method 300 may be able to be executed in parallel. For example, operations of the method 300 can be performed by a mobile robot. For example, the mobile robot can include an automated vehicle.

In FIG. 3A, in the method 300, at an operation 302, for example, the first motion prediction model module 106 can determine, operating a first motion prediction model, a first prediction of the location of the mobile robot at the future point in time. For example, the first motion prediction model can be selected from the group consisting of a kinematic model, a dynamic model, another physics-based model, or a machine learning-based model.

At an operation 304, for example, the second motion prediction model module 108 can determine, operating a second motion prediction model, a second prediction of the location of the mobile robot at the future point in time. For example, the second motion prediction model can be selected from the group consisting of the kinematic model, the dynamic model, the other physics-based model, or the machine learning-based model. The second motion prediction model can be different from the first motion prediction model.

At an operation 306, for example, the decision module 110 can determine an existence of a first condition.

In FIG. 3B, in the method 300, at an operation 308, for example, the actuator module 112 can cause, based on a determination of the existence of the first condition, the mobile robot to move based on one or more of the first prediction or the second prediction.

In FIG. 3A, in the method 300, in a first implementation, the first condition can be a speed of the mobile robot being less than a first threshold speed (e.g., five miles per hour).

In a first variation of the first implementation, the actuator module 112 can: (1) cause, in response to the existence of the first condition, the mobile robot to move based on the first prediction and (2) cause, in response to a lack of the existence of the first condition, the mobile robot to move based on the second prediction.

In a second variation of the first implementation, at an operation 310, the decision module 110 can determine an existence of a second condition. The second condition can be the speed of the mobile robot being greater than a second threshold speed (e.g., twenty-five miles per hour). The second threshold speed can be greater than the first threshold speed. The actuator module 112 can: (1) cause, in response to the existence of the first condition, the mobile robot to move based on the first prediction, (2) cause, in response to the existence of the second condition, the mobile robot to move based on the second prediction, and (3) cause, in response to a lack of the existence of the first condition and a lack of the existence of the second condition, the mobile robot to move based on one or more of the first prediction or the second prediction.

In a first adaptation of the second variation of the first implementation, at an operation 312, the decision module 110 can calculate a first interpolant. The first interpolant can be between the first prediction and the second prediction. The actuator module 112 can cause, in response to the lack of the existence of the first condition and the lack of the existence of the second condition, the mobile robot to move based on the first interpolant.

In a first modification of the first adaptation of the second variation of the first implementation, at an operation 314, the decision module 110 can determine an existence of a third condition. At an operation 316, the decision module 110 can determine an existence of a fourth condition. The third condition can be the speed of the mobile robot being equal to the first threshold speed. The fourth condition can be the speed of the mobile robot being equal to the second threshold speed. The decision module 110 can: (1) cause, in response to the existence of the third condition, a value of the first interpolant to be equal to the first prediction, (2) cause, in response to the existence of the fourth condition, the value of the first interpolant to be equal to the second prediction, and (3) cause, in response a lack of the existence of the third condition and a lack of the existence of the fourth condition, the value of the first interpolant to be equal to a value of a function. For example, the function can be a linear function. Alternatively, for example, the function can be a sigmoid function.

In FIG. 3B, in the method 300, in a second modification of the first adaptation of the second variation of the first implementation, at an operation 318, the first motion prediction model module 106 can determine, operating the first motion prediction model, a first prediction of a pose of the mobile robot at the future point in time. At an operation 320, the second motion prediction model module 108 can determine, operating the second motion prediction model, a second prediction of the pose of the mobile robot at the future point in time. At an operation 322, the decision module 110 can determine, based on one or more of the first prediction of the pose or the second prediction of the pose, a heading direction of the mobile robot. The actuator module 112 can cause, based on the heading direction, the mobile robot to move.

For example, in the second modification of the first adaptation of the second variation of the first implementation, the decision module 110 can determine, based on the one or more of the first prediction of the pose or the second prediction of the pose, the heading direction by: (1) determining, in response to the existence of the first condition, the heading direction based on the first prediction of the pose, (2) determining, in response to the existence of the second condition, the heading direction based on the second prediction of the pose, and (3) determining, in response to the lack of the existence of the first condition and the lack of the existence of the second condition, the heading direction based on the one or more of the first prediction of the pose or the second prediction of the pose.

Additionally, in this example of the second modification of the first adaptation of the second variation of the first implementation, at an operation 324, the decision module 110 can calculate a second interpolant. The second interpolant can be between the first prediction of the pose and the second prediction of the pose. The decision module 110 can determine the heading direction based on the second interpolant.

For example, an angle can be formed between a direction associated with a prediction of the pose and a direction associated with a frame of reference. The frame of reference can be independent of the mobile robot. The angle can be different from a reflex angle (i.e., an angle between 180 degrees and 360 degrees). That is, if the angle is formed on a first side of the direction associated with the frame of reference, then the angle can be represented by a positive number; if the angle is formed on a second side of the direction associated with the frame of reference, then the angle can be represented by a negative number. At an operation 326, the decision module 110 can adjust, before the operation 324, one or more of: (1) the angle formed on the first side of the direction associated with the frame of reference or (2) the angle formed on the second side of the direction associated with the frame of reference to prevent, in the second interpolant, an error associated with: (1) an angle formed between a direction associated with the first prediction of the pose and the direction associated with the frame of reference having a first sign and (2) an angle formed between a direction associated with the second prediction of the pose and the direction associated with the frame of reference having a second sign.

Moreover, in this example of the second modification of the first implementation of the second variation of the first implementation, the decision module 110 can adjust the one or more of: (1) the angle formed on the first side of the direction associated with the frame of reference or (2) the angle formed on the second side of the direction associated with the frame of reference by: (1) determining which of the first sign and the second sign is a negative sign, (2) adding, based on a determination that the first sign is the negative sign, 360 degrees to the angle formed on the first side of the direction associated with the frame of reference, and (3) adding, based on a determination that the second sign is the negative sign, 360 degrees to the angle formed on the second side of the direction associated with the frame of reference.

Additionally or alternatively, in this example of the second modification of the first implementation of the second variation of the first implementation, the decision module 110 can adjust the one or more of: (1) the angle formed on the first side of the direction associated with the frame of reference or (2) the angle formed on the second side of the direction associated with the frame of reference by: (1) determining the heading direction based on a tracking of a path of travel of the mobile robot, (2) determining if the heading direction, based on the first prediction of the pose, is different from the heading direction, based on the tracking of the path of travel of the mobile robot, by greater than a threshold amount, (3) determining if the heading direction, based on the second prediction of the pose, is different from the heading direction, based on the tracking of the path of travel of the mobile robot, by greater than the threshold amount, (4) adjusting the heading direction, based on the first prediction of the pose, based on a determination that a difference between the heading direction, based on the first prediction of the pose, and the heading direction, based on the tracking of the path of travel of the mobile robot, is greater than the threshold amount, and (5) adjusting the heading direction, based on the second prediction of the pose, based on a determination that a difference between the heading direction, based on the second prediction of the pose, and the heading direction, based on the tracking of the path of travel of the mobile robot, is greater than the threshold.

In FIG. 3C, in the method 300, in a second adaptation of the second variation of the first implementation, at an operation 328, the first motion prediction model module 106 can cause a cessation of an operation of the first motion prediction model in response to a determination of the existence of the first condition for greater than a threshold duration of time (e.g., five minutes). At an operation 330, the second motion prediction model module 108 can cause a cessation of an operation of the second motion prediction model in response to a determination of the existence of the second condition for greater than the threshold duration of time.

In a second implementation, the first condition can be a degree of curvature of a road at a current location of the mobile robot being greater than a threshold degree of curvature.

In a variation of the second implementation, the actuator module 112 can: (1) cause, in response to the existence of the first condition, the mobile robot to move based on the first prediction and (2) cause, in response to a lack of the existence of the first condition, the mobile robot to move based on the second prediction.

Figure 4:
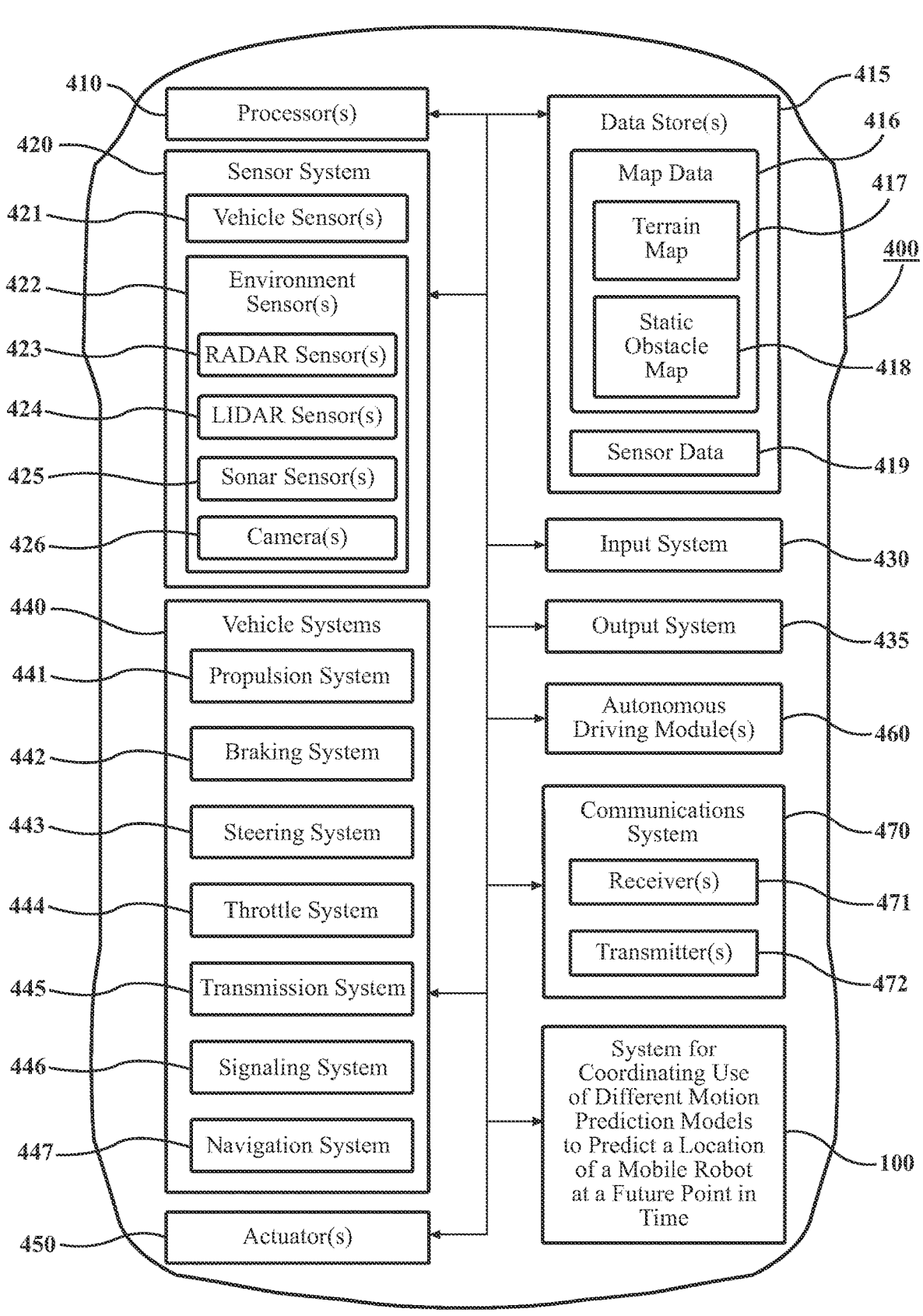
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles. For example, functions and/or operations of the vehicle 216 (illustrated in FIG. 2) can be realized by the vehicle 400.

In some embodiments, the vehicle 400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an automated vehicle. As used herein, "automated vehicle" can refer to a vehicle that operates in an automated mode. As used herein, "automated mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-automated operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more automated driving modules 460, a communications system 470, and the system 100 for coordinating use of different motion prediction models to predict a location of a mobile robot at a future point in time.

In one or more arrangements, the one or more processors 410 can be a main processor of the vehicle 400. For example, the one or more processors 410 can be an electronic control unit (ECU). For example, functions and/or operations of the processor 102 (illustrated in FIG. 1) can be realized by the one or more processors 410.

The one or more data stores 415 can store, for example, one or more types of data. The one or more data stores 415 can include volatile memory and/or non-volatile memory. For example, functions and/or operations of the memory 104 (illustrated in FIG. 1) can be realized by the one or more data stores 415. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Alternatively or additionally, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Alternatively or additionally, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangements, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in the digital map.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more automated driving modules 460. Any suitable actuator can be used. For example, the one or more actuators 450 can include motors, pneumatic actuators, hydraulic pistons, relays, solenoids, and/or piezoelectric actuators.

The one or more processors 410 and/or the one or more automated driving modules 460 can be operatively connected to communicate with the various vehicle systems 440 and/or individual components thereof. For example, the one or more processors 410 and/or the one or more automated driving modules 460 can be in communication to send and/or receive information from the various vehicle systems 440 to control the movement, speed, maneuvering, heading, direction, etc. of the vehicle 400. The one or more processors 410 and/or the one or more automated driving modules 460 may control some or all of these vehicle systems 440 and, thus, may be partially or fully automated.

The one or more processors 410 and/or the one or more automated driving modules 460 may be operable to control the navigation and/or maneuvering of the vehicle 400 by controlling one or more of the vehicle systems 440 and/or components thereof. For example, when operating in an automated mode, the one or more processors 410 and/or the one or more automated driving modules 460 can control the direction and/or speed of the vehicle 400. The one or more processors 410 and/or the one or more automated driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 470 can include one or more receivers 471 and/or one or more transmitters 472. The communications system 470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 470 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 410, the one or more data stores 415, and the communications system 470 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Alternatively or additionally, one or more of the modules can be executed on and/or distributed among other processing systems to which the one or more processors 410 can be operatively connected. The modules can include instructions (e.g., program logic) executable by the one or more processors 410. Alternatively or additionally, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more automated driving modules 460. The one or more automated driving modules 460 can be configured to receive data from the sensor system 420 and/or any other type of system capable of capturing information relating to the vehicle 400 and/or the external environment of the vehicle 400. In one or more arrangements, the one or more automated driving modules 460 can use such data to generate one or more driving scene models. The one or more automated driving modules 460 can determine position and velocity of the vehicle 400. The one or more automated driving modules 460 can determine the location of obstacles, obstacles, or other environmental features including traffic signs, trees, shrubs, neighboring vehicles, pedestrians, etc.

The one or more automated driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more automated driving modules 460 can be configured to determine one or more travel paths, current automated driving maneuvers for the vehicle 400, future automated driving maneuvers and/or modifications to cur-rent automated driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more automated driving modules 460 can be configured to implement determined driving maneuvers. The one or more automated driving modules 460 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more automated driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2, 3A through 3C, and 4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having." as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for coordinating use of different motion prediction models, comprising:
    a mobile robot configured to move in response to a receipt of a control signal;
    a processor; and
    a memory storing:
        a first motion prediction model module including instructions that cause the processor to:
            determine, operating a first motion prediction model, a first prediction of a location of the mobile robot at a future point in time; and
            cause a cessation of an operation of the first motion prediction model in response to a determination of an existence of a first condition for greater than a predetermined threshold duration of time, the first condition being a speed of the mobile robot being less than a first threshold speed or a degree of curvature of a road being greater than a threshold degree;
        a second motion prediction model module including instructions that cause the processor to determine, operating a second motion prediction model, a second prediction of the location; and
        an actuator module including instructions that cause, based on the determination of the existence of the first condition, the control signal to be sent to the mobile robot to move, based on at least the second prediction, to prevent an indeterminant value being used as the location, the first motion prediction model being capable, during the existence of the first condition, of producing an indeterminant value for the first prediction.

2. The system of claim 1, wherein the mobile robot comprises an automated vehicle.

3. The system of claim 1, wherein the instructions to cause the control signal to be sent to the mobile robot to move include:
    instructions to cause, in response to the existence of the first condition, the mobile robot to move based on the second prediction, and
    instructions to cause, in response to a lack of the existence of the first condition, the mobile robot to move based on the first prediction.

4. The system of claim 1, wherein:
    the decision module further includes instructions to determine an existence of a second condition, the second condition being the speed of the mobile robot being greater than a second threshold speed, the second threshold speed being greater than the first threshold speed, and the instructions to cause the control signal to be sent to the mobile robot to move include:

instructions to cause, in response to the existence of the first condition, the mobile robot to move based on the second prediction, instructions to cause, in response to the existence of the second condition, the mobile robot to move based on the first prediction, and instructions to cause, in response to a lack of the existence of the first condition and a lack of the existence of the second condition, the mobile robot to move based on at least one of the first prediction or the second prediction.

5. The system of claim 4, wherein:

the decision module further includes instructions to calculate a first interpolant, the first interpolant being between the first prediction and the second prediction, and the instructions to cause, in response to the lack of the existence of the first condition and the lack of existence of the second condition, the mobile robot to move based on the at least one of the first prediction or the second prediction include instructions to cause the mobile robot to move based on the first interpolant.

6. The system of claim 5, wherein:

the decision module further includes instructions to:

determine an existence of a third condition, the third condition being the speed of the mobile robot being equal to the first threshold speed; and determine an existence of a fourth condition, the fourth condition being the speed of the mobile robot being equal to the second threshold speed, and the instructions to calculate the first interpolant include:

instructions to cause, in response to the existence of the third condition, a value of the first interpolant to be equal to the second prediction, instructions to cause, in response to the existence of the fourth condition, the value of the first interpolant to be equal to the first prediction, and instructions to cause, in response to a lack of the existence of the third condition and a lack of the existence of the fourth condition, the value of the first interpolant to be equal to a value of a function.

7. The system of claim 6, wherein the function is a linear function.

8. The system of claim 6, wherein the function is a sigmoid function.

9. The system of claim 5, wherein:

the first motion prediction model module further includes instructions to determine, operating the first motion prediction model, a first prediction of a pose of the mobile robot at the future point in time, the second motion prediction model module further includes instructions to determine, operating the second motion prediction model, a second prediction of the pose of the mobile robot at the future point in time, the decision module further includes instructions to determine, based on at least one of the first prediction of the pose or the second prediction of the pose, a heading direction of the mobile robot, and the instructions to cause the control signal to be sent to the mobile robot to move include instructions to cause, based on the heading direction, the control signal to be sent to the mobile robot to move.

10. The system of claim 9, wherein the instructions to determine, based on the at least one of the first prediction of the pose or the second prediction of the pose, the heading direction include:

instructions to determine, in response to the existence of the first condition, the heading direction based on the first prediction of the pose, instructions to determine, in response to the existence of the second condition, the heading direction based on the second prediction of the pose, and instructions to determine, in response to the lack of the existence of the first condition and the lack of the existence of the second condition, the heading direction based on the at least one of the first prediction of the pose or the second prediction of the pose.

11. The system of claim 10, wherein:

the decision module further includes instructions to calculate a second interpolant, the second interpolant being between the first prediction of the pose and the second prediction of the pose, and the instructions to determine, in response to the lack of the existence of the first condition and the lack of the existence of the second condition, the heading direction based on the at least one of the first prediction of the pose or the second prediction of the pose include instructions to determine the heading direction based on the second interpolant.

12. The system of claim 11, wherein:

an angle is formed between a direction associated with a prediction of the pose and a direction associated with a frame of reference, the frame of reference is independent of the mobile robot, the angle is different from a reflex angle, if the angle is formed on a first side of the direction associated with the frame of reference, then the angle is represented by a positive number, if the angle is formed on a second side of the direction associated with the frame of reference, then the angle is represented by a negative number, and the decision module further includes instructions to adjust, before operation of the instructions to calculate the second interpolant, at least one of:

the angle formed on the first side of the direction associated with the frame of reference, or the angle formed on the second side of the direction associated with the frame of reference to prevent, in the second interpolant, an error associated with:

an angle formed between a direction associated with the first prediction of the pose and the direction associated with the frame of reference having a first sign, and an angle formed between a direction associated with the second prediction of the pose and the direction associated with the frame of reference having a second sign.

13. The system of claim 12, wherein the instructions to adjust the at least one of:

the angle formed on the first side of the direction associated with the frame of reference, or the angle formed on the second side of the direction associated with the frame of reference include:

instructions to determine which of the first sign and the second sign is a negative sign;

instructions to add, based on a determination that the first sign is the negative sign, 360 degrees to the angle formed on the first side of the direction associated with the frame of reference; and instructions to add, based on a determination that the second sign is the negative sign, 360 degrees to the angle formed on the second side of the direction associated with the frame of reference.

14. The system of claim 4, wherein the second motion prediction model module further includes instructions to cause a cessation of an operation of the second motion prediction model in response to a determination of the existence of the second condition for greater than the threshold duration of time.

15. A method for coordinating use of different motion prediction models, comprising:

determining, by a processor operating a first motion prediction model, a first prediction of a location of a mobile robot at a future point in time;

determining, by the processor operating a second motion prediction model, a second prediction of the location;

causing, by the processor and based on a determination of an existence of a condition, a control signal to be sent to the mobile robot to move, based on at least the first prediction, to prevent an indeterminant value being used as the location, the first motion prediction model being capable, during the existence of the condition, of producing an indeterminant value for the first prediction, the condition being a speed of the mobile robot being less than a threshold speed or a degree of curvature of a road being greater than a threshold degree;

causing, by the processor, a cessation of an operation of the first motion prediction model in response to the determination of the existence of the condition for greater than a predetermined threshold duration of time; and moving, in response to a receipt of the control signal, the mobile robot.

16. The method of claim 15, wherein:

the first motion prediction model is selected from the group consisting of a kinematic model, a dynamic model, another physics-based model, or a machine learning-based model; and the second motion prediction model is selected from the group consisting of the kinematic model, the dynamic model, the other physics-based model, or the machine learning-based model, the second motion prediction model being different from the first motion prediction model.

17. A system for coordinating use of different motion prediction models, comprising:

a processor; and a memory storing:

a first motion prediction model module including instructions that cause the processor to:

determine, operating a first motion prediction model, a first prediction of a location of a mobile robot at a future point in time; and cause a cessation of an operation of the first motion prediction model in response to a determination of an existence of a condition for greater than a predetermined threshold duration of time, the condition being a speed of the mobile robot being less than a threshold speed or a degree of curvature of a road being greater than a threshold degree;

a second motion prediction model module including instructions that cause the processor to determine, operating a second motion prediction model, a second prediction of the location; and an actuator module including instructions that cause, based on the determination of the existence of the condition, the mobile robot to move, based on at least the second prediction to prevent an indeterminant value being used as the location, by changing at least one of a direction or a speed, the first motion prediction model being capable, during the existence of the condition, of producing an indeterminant value for the second prediction.

* * * * *